US012614195B2

(12) United States Patent
Hogan et al.

(10) Patent No.: US 12,614,195 B2
(45) Date of Patent: Apr. 28, 2026

(54) RETENTION MANAGEMENT SYSTEM

(71) Applicant: Toshiba Global Commerce Solutions, Inc., Durham, NC (US)

(72) Inventors: Patricia Hogan, Raleigh, NC (US); Susan Brosnan, Raleigh, NC (US); Jessica Snead, Cary, NC (US); Daniel Goins, Wake Forest, NC (US); Matthew Slessman, Raleigh, NC (US)

(73) Assignee: Toshiba Global Commerce Solutions, Inc., Durhm, NC (US)

( * ) Notice: Subject to any disclaimer, the term of this patent is extended or adjusted under 35 U.S.C. 154(b) by 230 days.

(21) Appl. No.: 18/483,742

(22) Filed: Oct. 10, 2023

(65) Prior Publication Data

US 2025/0117808 A1     Apr. 10, 2025

(51) Int. Cl.
G06Q 30/018          (2023.01)
G06N 20/00          (2019.01)

(52) U.S. Cl.
CPC ........... G06Q 30/018 (2013.01); G06N 20/00 (2019.01)

(58) Field of Classification Search
None
See application file for complete search history.

(56) References Cited

U.S. PATENT DOCUMENTS

| | | | | | |
|---|---|---|---|---|---|
| 7,818,300 | B1 * | 10/2010 | Kilday | ................... | G06Q 50/18 |
| | | | | | 707/662 |
| 8,706,697 | B2 * | 4/2014 | Morsi | ................... | G06F 16/125 |
| | | | | | 707/661 |

| | | | | | |
|---|---|---|---|---|---|
| 8,903,784 | B2 * | 12/2014 | Freeman | ................. | G06F 16/93 |
| | | | | | 707/694 |
| 9,912,752 | B1 * | 3/2018 | Davis | ................... | G06F 16/2365 |
| 10,545,699 | B2 * | 1/2020 | Baptist | ................. | G06F 3/0659 |
| 10,990,282 | B1 * | 4/2021 | Lee | ........................ | G06F 3/0685 |
| 11,907,097 | B1 * | 2/2024 | Drutu | ................. | G06F 11/3075 |
| 11,914,550 | B1 * | 2/2024 | Mapp | ................. | G06F 11/3409 |
| 12,130,836 | B1 * | 10/2024 | Restivo | ................... | G06F 16/27 |
| 12,135,621 | B1 * | 11/2024 | Thomas | .............. | G06F 11/1469 |
| 2005/0096986 | A1 * | 5/2005 | Taylor | ................... | G06Q 40/02 |
| | | | | | 705/16 |
| 2006/0156382 | A1 * | 7/2006 | Motoyama | ............ | G06Q 10/10 |
| | | | | | 726/1 |

(Continued)

OTHER PUBLICATIONS

Kansara, Maheshbhai. "Cloud migration strategies and challenges in highly regulated and data-intensive industries: A technical perspective." International Journal of Applied Machine Learning and Computational Intelligence 11.12 (2021): 78-121. (Year: 2021).*

(Continued)

*Primary Examiner* — Asfand M Sheikh
(74) *Attorney, Agent, or Firm* — Stanek Lemon Crouse & Meeks, PA

(57) ABSTRACT

Disclosed herein are inventive concepts that facilitate the dynamic management of data retention. Data records associated with point-of-sale transactions can undergo evaluation based on data utilization metrics, which can include frequency of data access and timing of data access. A computational model can process these metrics to quantitatively assess each record based on a composite metric, leading to the generation of a data retention policy. Storage of at least some data can be modified to conform to the data retention policy.

19 Claims, 4 Drawing Sheets

(56) References Cited

U.S. PATENT DOCUMENTS

| | | | |
|---|---|---|---|
| 2007/0271308 A1* | 11/2007 | Bentley .................. | G06F 16/93 |
| 2013/0238575 A1* | 9/2013 | Amarendran .......... | G06F 16/21 |
| | | | 707/694 |
| 2017/0132233 A1* | 5/2017 | Ballai ..................... | H04L 63/04 |
| 2018/0293024 A1* | 10/2018 | Baptist ................. | G06F 3/0659 |
| 2018/0341473 A1* | 11/2018 | Watt, Jr. .............. | G06F 21/6218 |
| 2018/0357226 A1* | 12/2018 | Su ........................ | G06F 16/9535 |
| 2019/0272335 A1* | 9/2019 | Liu .......................... | G06F 16/21 |
| 2020/0076632 A1* | 3/2020 | Beloussov .......... | H04L 43/0876 |
| 2020/0133781 A1* | 4/2020 | Reddy Av .......... | G06F 11/1469 |
| 2020/0379663 A1* | 12/2020 | Long ..................... | G06F 3/067 |
| 2021/0014282 A1* | 1/2021 | Anctil ..................... | H04L 67/10 |
| 2021/0051521 A1* | 2/2021 | Misra ..................... | H04W 8/00 |
| 2022/0374292 A1* | 11/2022 | Jha ........................... | G06F 9/542 |
| 2023/0136439 A1* | 5/2023 | Anctil ..................... | H04L 67/55 |
| | | | 726/1 |
| 2023/0147671 A1* | 5/2023 | Narulkar ................ | G06F 21/79 |
| | | | 707/692 |
| 2023/0281160 A1* | 9/2023 | Gueta ................... | G06F 16/125 |
| | | | 707/694 |
| 2023/0350843 A1* | 11/2023 | Jagasia ............... | G06F 16/2358 |
| 2025/0021420 A1* | 1/2025 | Sethi ................... | G06F 11/0781 |

OTHER PUBLICATIONS

Understanding Storage Tiers, Oracle, Apr. 24, 2023, https://docs.oracle.com/en-us/iaas/Content/Object/Concepts/understandingstoragetiers.htm.

Data lifecycle management (DLM) definition, Tech Target, Jun. 2022, https://www.techtarget.com/searchstorage/definition/data-lifecycle-management.

Data Storage Options with Azure Storage and Cosmos DB, Azure Tips and Tricks, Microsoft, Oct. 21, 2018, https://microsoft.github.io/AzureTipsAndTricks/blog/tip166.html.

Amazon EFS lifecycle management, Amazon, https://docs.aws.amazon.com/efs/latest/ug/lifecycle-management-efs.html.

Object Lifecycle Management, Google Cloud, https://cloud.google.com/storage/docs/lifecycle.

Data Lifecycle Management, Fluix, https://fluix.io/help/data-lifecycle-management.

Storage Tiering: Making the Most of Your Storage Investment, Cloudian, https://cloudian.com/guides/data-backup/storage-tiering/.

Tiered Storage, druva, https://www.druva.com/glossary/what-is-tiered-storage-definition-and-related-faqs.

* cited by examiner

| Frequency of data access | Nature of the data | Source of the data | Timestamp |
|---|---|---|---|
| Daily | Sensitive | POS system | 2023-05-25 14:30:00 |

300

New Observation (without target variable or label) 343

310

Trained Model 345

Output 350

400

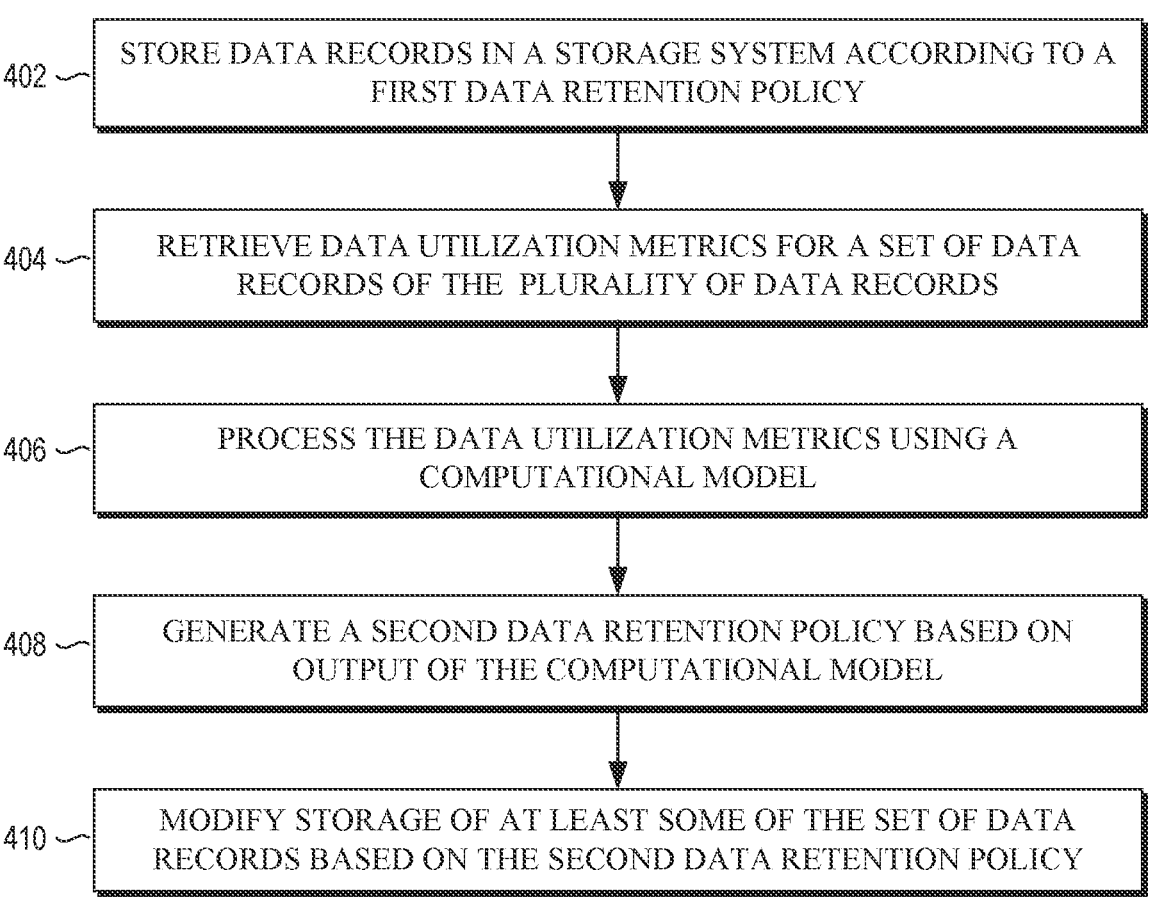

402 — STORE DATA RECORDS IN A STORAGE SYSTEM ACCORDING TO A FIRST DATA RETENTION POLICY

404 — RETRIEVE DATA UTILIZATION METRICS FOR A SET OF DATA RECORDS OF THE PLURALITY OF DATA RECORDS

406 — PROCESS THE DATA UTILIZATION METRICS USING A COMPUTATIONAL MODEL

408 — GENERATE A SECOND DATA RETENTION POLICY BASED ON OUTPUT OF THE COMPUTATIONAL MODEL

410 — MODIFY STORAGE OF AT LEAST SOME OF THE SET OF DATA RECORDS BASED ON THE SECOND DATA RETENTION POLICY

FIG. 4

RETENTION MANAGEMENT SYSTEM

BACKGROUND

Data retention remains a significant focus for various sectors, including retail. Within the realm of retail operations, considerable volumes of data can be generated, spanning inventory, sales metrics, customer interactions, transaction records, or the like. Conventional approaches to data retention commonly utilize fixed or predetermined settings, which may not be tailored to the attributes or usage patterns of the data. Moreover, retail personnel often lack formal training in data retention protocols, leading to variability and less-than-optimal practices. Such shortcomings can affect the allocation of storage resources, influence the timeliness and efficacy of data retrieval processes, and pose challenges in aligning with legal or organizational data retention guidelines.

BRIEF DESCRIPTION OF SEVERAL VIEWS OF THE DRAWINGS

Throughout the drawings, reference numbers can be re-used to indicate correspondence between referenced elements. The drawings are provided to illustrate embodiments of the present disclosure and do not to limit the scope thereof.

FIG. 4 is a flow diagram illustrative of an embodiment of a process for dynamic retention management.

DETAILED DESCRIPTION

Some inventive concepts relate to dynamically managing how long various types of data are kept in databases before the data is deleted or moved to remote storage. Traditionally, data retention parameters can be pre-established or manually configured by an end-user. However, in some settings like retail environments, where the users may lack technical expertise, determining suitable data retention settings can be challenging. To mitigate these and other complexities, some inventive concepts dynamically adjust data retention settings, taking into account various data utilization metrics, including but not limited to, frequency of data access, timing of data access, the nature of the data, or legal or organizational compliance requirements. Some inventive concepts extend to the granular level, enabling the system to ascertain and implement data retention settings uniquely suited to each type of data or even to individual data records.

Some inventive concepts can facilitate adaptable, real-time management of data retention, which can be advantageous in dynamic environments with variable data needs. For instance, the inventive concepts can help manage limited server storage effectively, reducing the risk of operational disruptions due to server overload. Additionally, dynamic adjustments to data retention settings can help mitigate costs by reducing the amount of stored data and/or ensuring that the amount of stored data does not exceed storage limits, such as those associated with a storage tier.

Figure 1:
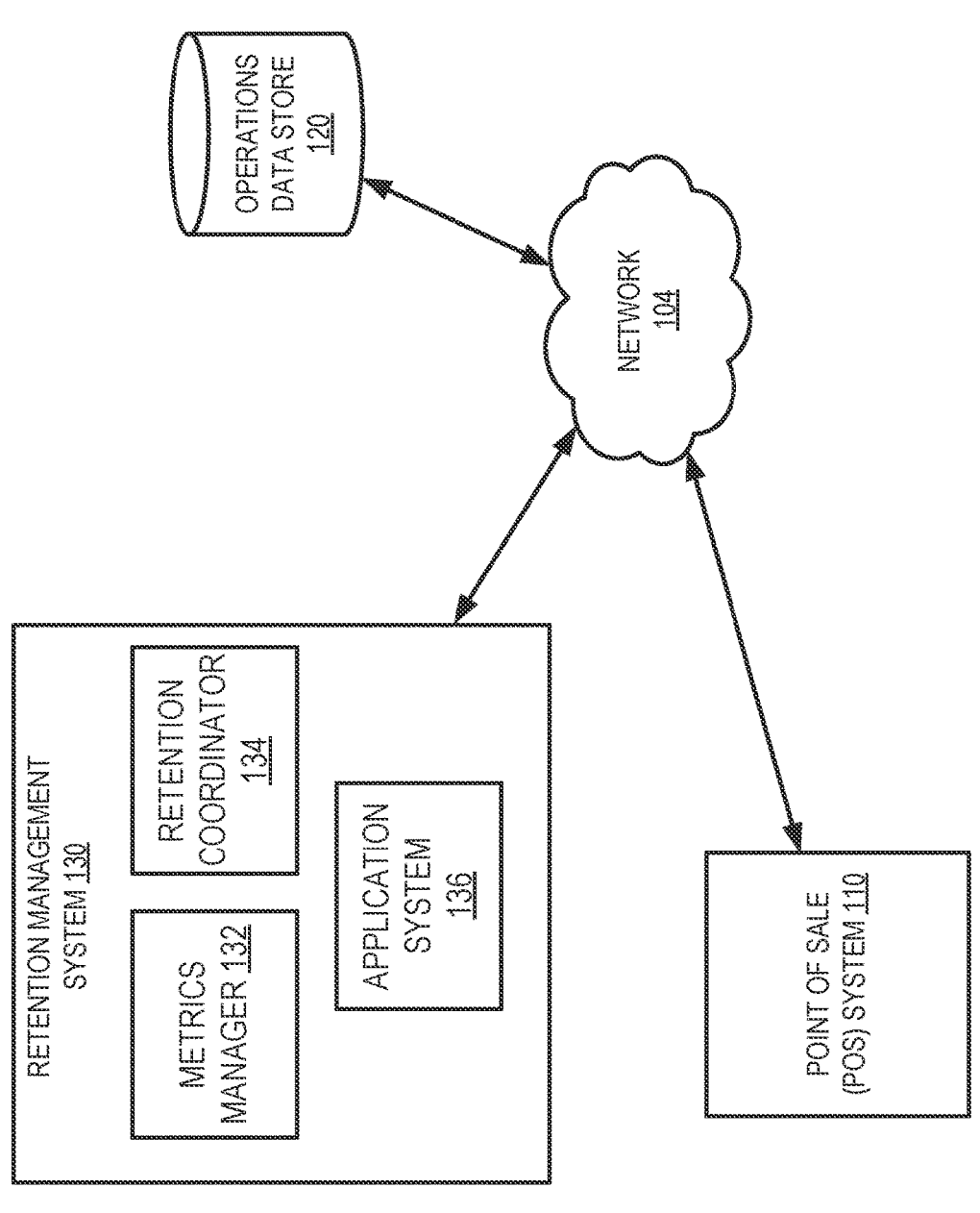
FIG. 1 provides an example system architecture diagram, illustrating how data flows between the retail operations, data storage, and the trained neural network for generating individually tailored data retention settings.

FIG. 1 illustrates an embodiment of an environment 100 that includes a network 104, a point-of-sale (POS) system 110, an operations data store 120, and a retention management system 130. In the illustrated embodiment, the retention management system 130 includes a metrics manager 132, a retention coordinator 134, and an application system 136. To simplify discussion and not to limit the present disclosure, FIG. 1 illustrates only one POS system 110, operations data store 120, retention management system 130, metrics manager 132, retention coordinator 134, and application system 136; however, multiple may be used.

Any of the foregoing components or systems of the environment 100 may communicate via the network 104. The network 104 can enable the transmission of data packets between the components of the system, including the POS system 110, the operations data store 120, the retention management system 130, the metrics manager 132, the retention coordinator 134, and/or the application system 136. Although only one network 104 is illustrated, multiple distinct and/or distributed networks 104 may exist. The network 104 can include any type of communication network. For example, the network 104 can include one or more of a wide area network (WAN), a local area network (LAN), a cellular network, an ad hoc network, a satellite network, a wired network, a wireless network, and so forth. In some embodiments, the network 104 can include the Internet.

Any of the foregoing components or systems of the environment 100, such as any one or any combination of the POS system 110, the operations data store 120, the retention management system 130, the metrics manager 132, the retention coordinator 134, and/or the application system 136 may be implemented using combined or individual computing devices, processors, distributed processing systems, servers, isolated execution environments (e.g., virtual machines, containers, etc.), shared computing resources, or so on. Furthermore, any of the foregoing components or systems of the environment 100 may host or execute one or more client applications, which may include a web browser, a mobile application, a background process that performs various operations with or without direct interaction from a user, or a "plug-in" or "extension" to another application, such as a web browser plug-in or extension.

The POS system 110 facilitates the execution of POS transactions and serves as a nexus for the generation and management of diverse data sets. The POS system 110 can be in communication with or integrated into a variety of hardware and software components, including but not limited to, a processor, a memory storage unit, a barcode scanner, a receipt printer, a digital scale, a dimension analyzer, or a payment interface. The payment interface itself can include, but is not limited to, a magnetic stripe reader, a pin pad for secure payment entry, a signature capture device, or a biometric authentication device. The POS system 110 may include a user interface that can include elements such as a touchscreen or keyboard. The user interface can allow for personnel or customer interactions (e.g., self-checkout). These components can individually or collectively contribute to the completion and enhancement of a transactional process, thereby generating data of varying types and complexities.

The POS system 110 is configured to generate, capture, and manage a multi-faceted array of data, offering utility in various operational domains. In the context of data types generated, the POS system 110 can generate transactional data that can include, but is not limited to, item identifiers, quantities, payment methods, or temporal markers. The POS system 110 can facilitate additional transactional activities such as processing returns or handling inquiries, thereby producing specialized sets of data pertinent to these functions. In some cases, the POS system 110 can yield customer interaction data, which can be derived from mechanisms like loyalty or payment cards and can provide insights into customer behavior and preferences. Inventory-related data can be updated continuously and may include metrics such as product availability, stock levels, or turnover rates. In some cases, audit trails can be generated to log a subset of all transactions, thereby providing data sets for compliance or operational review.

The operations data store 120 stores a plurality of data records. Each data record within the data store can be associated with corresponding data retention settings. The data retention settings can serve to dictate the period for which the associated data record can be stored within the operations data store 120. Consequently, each data record can hold data and can also be associated with governing criteria that outlines its retention lifecycle within the operations data store 120. As described herein, the retention management system 130 can manage, generate, and apply the data retention settings, for example, according to a data retention policy. The operations data store 120 can store one or more of various data types. The data types can include, but are not limited to, transactional data, customer interaction data, promotional data, inventory data, or employee data.

Transactional data can include information relating to individual or aggregate retail transactions. The transactional data include, but is not limited to, item identifiers, quantities, payment modalities, sales receipts, timing data relating to a transaction, and pricing information. Collectively, these elements contribute to a robust data set, capable of fulfilling a diverse range of retail transactional requirements.

Customer interaction data can include information relating to customer engagement. Customer interaction data can include information captured through mechanisms like loyalty and payment cards. In addition, or alternatively, customer interaction data can extend to behavioral metrics such as frequency or timing of purchases. In some cases, some or all of the customer interaction data can be associated with the transactional data to establish an understanding of individual consumer actions, including but not limited to, identifying purchases for returns or other customer service activities.

Promotional data serves can include information relating to past, ongoing, or forthcoming retail promotions or sales. The promotional data can include, but is not limited to, metrics, timelines, or performance indicators associated with both ongoing and forthcoming retail promotions. In some cases, the promotional data can include information relating to the structure or timing of promotional campaigns. In addition, or alternatively, the promotional data can include information relating to evaluations of promotional efficacy through metrics such as customer engagement levels, sales uplift, and return on investment.

Inventory data can include information relating to a broad array of real-time or non-real-time metrics relating to inventory management. Inventory data can include, but is not limited to, stock levels, turnover rates, and product availability, as well as additional salient factors such as seasonal demand fluctuations and supplier lead time.

Employee data can include a range of metrics or details related to workforce management. Employee data can include, but is not limited to, information relating to scheduling, work hours, or check-in and check-out times. Employee data can include lists of employees, encompassing current and/or former staff members. Employee data can include aggregated work hours for time periods, personnel identifiers like names or employee numbers, or other personally identifiable information (PII). Employee data can include elements such as salary or wage figures or the duration of an individual's employment with the company.

The operations data store 120 can be implemented as cloud storage, such as Amazon Simple Storage Service (S3), Elastic Block Storage (EBS) or CloudWatch, Google Cloud Storage, Microsoft Azure Storage, InfluxDB, etc. The operations data store 120 can be configured to provide high availability, highly resilient, low loss data storage. The operations data store 120 can include Amazon CloudWatch metrics. In some cases, to provide the high availability, highly resilient, low loss data storage, the operations data store 120 can store multiple copies of the data in the same and different geographic locations and across different types of data stores (for example, solid state, hard drive, tape, etc.). Further, as data is received at the operations data store 120 it can be automatically replicated multiple times according to a replication factor to different data stores across the same and/or different geographic locations. In some cases, the operations data store 120 includes a limited or fixed memory storage, such as 64 GB, 128 GB, 256 GB, 1 TB, etc.

The retention management system 130 can be configured to dynamically manage the retention of data within the operations data store 120. The retention management system 130 can generate or update a data retention policy based on various factors including, but not limited to, regulatory compliance, operational needs, frequency of data access and timing of data access, the nature and source of the data, legal or organizational compliance requirements, storage utilization metrics, priority tags, file types, or file sizes. In some instances, these factors may contribute to machine learning algorithms tasked with modifying or generating the data retention policy. By applying this data retention policy, the retention management system 130 can adjust retention settings associated with individual data records or sets of data records within the operations data store 120. Actions such as the deletion or migration of data can be executed in accordance with the data retention policy. Through these capabilities, the retention management system 130 can serve to manage storage resource allocation, reduce operational costs, and ensure compliance with relevant regulatory standards. The retention management system 130 can include a metrics manager 132, a retention coordinator 134, and an application system 136.

The metrics manager 132 collects and/or processes data utilization metrics from the operations data store 120. These metrics may include, but are not limited to, attributes such as frequency of data access and timing of data access, the nature and source of the data, storage utilization metrics, priority tags, file types, or file sizes. The data utilization metrics can be utilized for generating tailored data retention policies. In some embodiments, the metrics manager 132 can be configured to preprocess these metrics to generate feature vectors, which can be used to contribute to machine learning algorithms tasked with refining data retention policies to align with evolving operational or regulatory requisites.

The retention coordinator 134 can generate or update data retention policies based on the metrics and/or feature vectors furnished by the metrics manager 132, as well as adapt the data retention policies in response to the nature of the data currently stored and the evolving metrics. The data retention policies can be structured to consider an array of factors, including but not limited to, regulatory compliance, operational necessities, frequency of data access and timing of data access, the nature and source of the data, legal or organizational compliance prerequisites, storage utilization metrics, priority tags, file types, or file sizes. In some embodiments, the retention coordinator 134 can include or interface with machine learning algorithms designed for the iterative refinement of these data retention policies.

The data retention policy can be employed to assign or associate data retention settings to the data records. The data retention policy can include rules, criteria, or conditions that govern the storage duration for each data record. The data retention policy can specify data retention settings for individual data records or sets of data records, dictating how long the data records should be retained in the operations data store 120 before they are either deleted or moved to a remote storage facility. The data retention policy can be influenced by various factors including, but not limited to, regulatory compliance, operational needs, frequency of data access and timing of data access, the nature and source of the data, legal or organizational compliance requirements, storage utilization metrics, priority tags, file types, or file sizes. In some instances, these factors may contribute to machine learning algorithms tasked with modifying the data retention policy to meet evolving organizational or regulatory requirements.

The data retention policy can be based on operational needs. For example, operational needs may indicate a requirement for rapid access to data records concerning recent customer interactions. In some such cases, the data retention policy can indicate that these data records should be associated with data retention settings facilitating quick retrieval.

In some cases, the data retention policy can be dictated by the frequency of data access and timing of data access. For example, sales data may be most accessed at fiscal quarter ends. In some such cases, the data retention policy can indicate that these data records should be associated with data retention settings geared toward both long-term storage and expedited access during times. As another example, frequent access to data records may indicate their importance, which can suggest extended storage periods. In some such cases, the data retention policy can indicate that frequently accessed data records should be associated with data retention settings that enable longer storage durations. As another example, the data retention policy can be influenced by infrequent data access to dictate shorter storage durations. For example, infrequent access may signify that the data is less critical. In some such cases, the data retention policy can indicate that infrequently accessed data records should be associated with data retention settings enabling shorter storage durations.

The data retention policy can be based on the nature and source of the data. For example, the nature of the data may include categories such as transactional, customer, or employee data, and the source may include points of origin like POS systems or external databases. In some such cases, the data retention policy can indicate that transactional data records from POS systems should be associated with data retention settings for extended storage duration due to their criticality.

The data retention policy can be based on regulatory compliance. For example, regulatory compliance may indicate that data records containing financial transactions must be retained for a minimum duration, such as seven years, to comply with tax regulations. In some such cases, the data retention policy can indicate that data records related to financial transactions should be associated with data retention settings corresponding to a seven-year storage duration.

The data retention policy can be based on legal or organizational compliance requirements. For example, organizational compliance may require that employee data should not be stored beyond the period of employment. In some such cases, the data retention policy can indicate that employee data records should be associated with data retention settings that prompt deletion after the employment term concludes. As an example, data records may be required to be retained for extended periods to comply with legal or business rules. In some such cases, the data retention policy can indicate that these data records should be associated with data retention settings that mandate longer storage durations.

In some cases, the data retention policy can be calibrated based on storage utilization metrics. For example, the storage utilization metrics may quantify that the operations data store 120 has reached X % (e.g., 50%, 70%, 85%, 95%, 100%) of its total storage capacity. When the residual storage capacity descends beneath a pre-specified threshold, for instance, 50%, 30%, 15%, 5%, 0%, the data retention policy can become operative to manage the allocation of storage resources in a more focused manner. Under such circumstances, the data retention policy can stipulate that data records deemed as lower priority-defined, for instance, by factors such as frequency of data access below a certain percentile, non-critical operational role, or absence of high-priority tags-should be associated with data retention settings oriented towards more abbreviated storage periods. An example of this might be data retention settings that instruct a 30-day automatic deletion cycle for these lower-priority data records. Conversely, data records categorized as higher priority-defined by factors such as elevated access frequency, critical operational importance, or presence of high-priority or sensitivity tags-could be associated with data retention settings designed for extended storage durations.

In some instances, the data retention policy can be formulated based on the presence of priority tags assigned to individual data records, sets of data records, or types of data records. These priority tags can serve as qualifiers, marking data records with varying levels of importance, sensitivity, or both. For example, a three-tiered priority tag system might be implemented, comprising 'High', 'Medium', and 'Low' tags. In scenarios where a data record is tagged as 'High Priority', denoting attributes such as, but not limited to, crucial operational relevance, legal implications, or high frequency of access, the data retention policy may specify that such records should be associated with data retention settings that mandate longer storage durations. This could translate to data retention settings that enforce a multi-year storage period, coupled with robust encryption protocols for added security. On the other hand, data records tagged as 'Low Priority', which may indicate limited operational utility or lower sensitivity, could be associated with data retention settings favoring shorter retention cycles, such as on the order of weeks to months. It will be appreciated that other tiered approaches, not limited to a three-tier system, can also be utilized to achieve similar objectives.

In some cases, the data retention policy can consider patterns of manual changes to similar types of data records. For example, if manual deletions are frequently applied to a first type of data record, this could be noted and copied into the data retention policy. In some such cases, the data retention policy can indicate that similar types of data records should be associated with data retention settings that mimic these manual changes. As another example, if a data record has been recently modified or updated, it may be considered timely and relevant. In some such cases, the data retention policy can indicate that recently modified data records should be associated with data retention settings that allow for extended storage periods.

In some cases, the data retention policy can be based on the obsolescence of the data for shorter storage durations. For example, outdated or irrelevant data may not require long-term storage. In some such cases, the data retention policy can indicate that obsolete data records should be associated with data retention settings facilitating shorter storage periods.

In some cases, the data retention policy can consider the temporary nature of the data for shorter storage durations. For example, cache or temporary files might be inherently transient. In some such cases, the data retention policy can indicate that data records of a temporary nature should be associated with data retention settings that allow for shorter Time-to-Live (TTL) values.

In some embodiments, the data retention policy can be formulated based on the file types associated with the data records. For instance, the data retention policy can recognize and categorize the distinct file types encompassed in the data records, thereby affecting the duration for which these records can be stored. These file types may vary across embodiments including, but not limited to, text files (.txt, .docx), image files (.jpg, .png), binary data (.bin), or more complex data structures like relational databases (.sql). For instance, text files, commonly used for transactional records or regulatory compliance documentation, can be associated with data retention settings that might be associated with extended storage durations. This extended storage duration could be due to the need for long-term legal retention or business continuity. Conversely, image files, often linked to marketing materials or customer interactions, may be set to shorter storage durations if they are found to have less enduring relevance. Thus, the data retention policy can leverage characteristics and/or common uses of each file type to dictate nuanced, file-type-based data retention settings, managing storage duration accordingly.

In some cases, the data retention policy can be based on file sizes. Parameters for file sizes, typically expressed in units such as bytes, megabytes, or terabytes, can serve as factors influencing the storage duration for data records. When data records incorporate files satisfying a first threshold, such as 500 megabytes, the data retention policy can stipulate that these records should be associated with data retention settings favoring shorter storage durations. Such shorter durations could be set to last for a period not exceeding three months, for instance, to mitigate the consumption of storage resources. Conversely, data records containing files that do not satisfy a second threshold, such as 50 megabytes, can be associated with data retention settings prescribing extended storage periods, potentially lasting over a year. This methodological approach allows the operations data store 120 to judiciously allocate its storage capabilities.

In some cases, the data retention policy can be based on data type. As mentioned, the operations data store 120 can store a plurality of data records. Each data record can be associated with one of a plurality of data types. These data types can be differentiated based on their functional attributes within the retail environment, such as the content of the data itself. For example, the data types can include, but are not limited to, transactional type, customer interaction type, promotional type, inventory type, or employee type. In some cases, the data retention policy can vary the duration for which different types of data are stored. For example, the policy may indicate a longer retention period for employee data compared to transactional data.

The application system 136 can implement the data retention policy produced by the retention coordinator 134 onto the operations data store 120. By doing so, the application system 136 ensures that the data records within the operations data store 120 complies with the corresponding data retention policies. This capability allows for the nuanced management of data, aligning closely with both operational efficacy and compliance with regulatory norms.

In some cases, the application system 136 can implement a data retention policy by interfacing with the operations data store 120 through an application programming interface (API) or similar communication protocol. Upon receipt of updated or newly generated data retention policy, the application system 136 can initiate a series of commands that modify the metadata or tags associated with data records or sets of data records within the operations data store 120. These metadata modifications dictate how and when the data should be managed, which can include actions such as deletion, archiving, or migration to different storage tiers. The application system 136 may employ a validation mechanism to confirm the successful implementation of the new settings, thereby ensuring data integrity and compliance with policy objectives.

Figure 2:
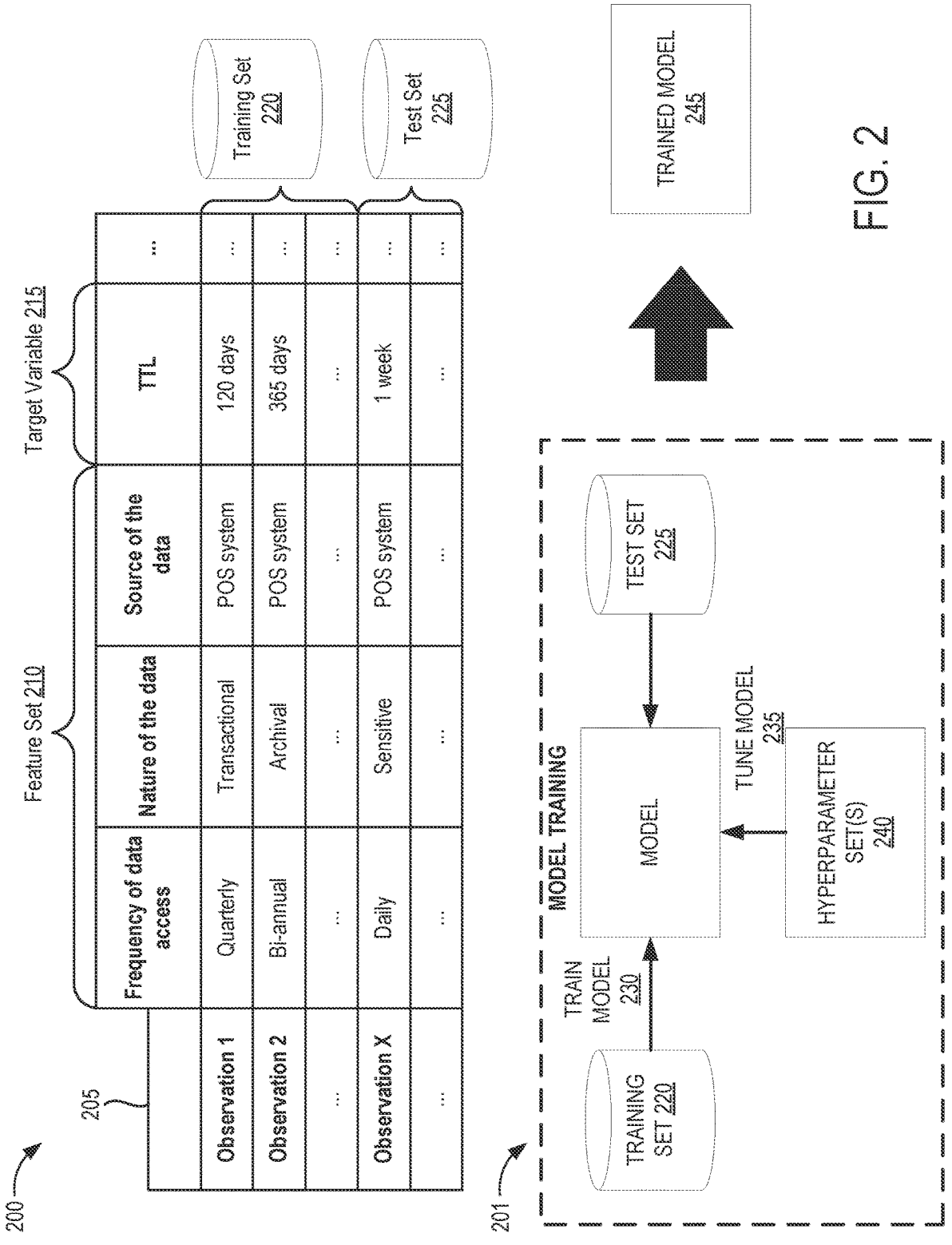
FIG. 2 is a diagram illustrating an example of training a machine learning model in connection with the present disclosure.

FIG. 2 is a diagram 200 illustrating an example of training a machine learning model 211 in connection with the present disclosure. The training of the machine learning model 211 described herein may be performed using a machine learning system 300. The machine learning system 300 may include, or be part of, a computing device, a server, a cloud computing environment, or the like, such as the POS system 110, the operations data store 120, the retention management system 130, the metrics manager 132, the retention coordinator 134, and/or the application system 136 of FIG. 1.

As shown by reference number 205, a machine learning model 211 may be trained using a set of observations. The set of observations may be obtained and/or input from historical data, such as data gathered during one or more processes described herein. For example, the set of observations may include data gathered from the POS system 110, the operations data store 120, the retention management system 130, the metrics manager 132, the retention coordinator 134, and/or the application system 136, as described elsewhere herein. In some implementations, the machine learning system 300 may receive the set of observations (e.g., as input) from the POS system 110, the operations data store 120, the retention management system 130, the metrics manager 132, the retention coordinator 134, the application system 136, or from a storage device.

As shown by the feature set 210, a feature set may be derived from the set of observations. The feature set may include a set of variables. A variable may be referred to as a feature. An observation may include a set of variable values corresponding to the set of variables. A set of variable values may be an observation. In some cases, different observations may be associated with different sets of variable values, sometimes referred to as feature values.

In some implementations, the machine learning system 300 may determine variables for a set of observations and/or variable values for an observation based on input received from the POS system 110, the operations data store 120, the retention management system 130, the metrics manager 132, the retention coordinator 134, and/or the application system 136. For example, the machine learning system 300 may identify a feature set (e.g., one or more features and/or corresponding feature values) from structured data input to the machine learning system 300, such as by extracting data from a column of a table, extracting data from a field of a form and/or a message, and/or extracting data received in a structured data format. Additionally, or alternatively, the machine learning system 300 may receive input from the POS system 110, the operations data store 120, the retention management system 130, the metrics manager 132, the retention coordinator 134, the application system 136, or from an operator to determine features and/or feature values.

As an example, a feature vector for a set of data records may include a first feature related to frequency of data access, a second feature related to nature of the data, a third feature related to source of data, and so on. For instance, the first feature can have a value of "Quarterly," denoting data records accessed frequently at the end of fiscal quarters. The second feature can be assigned a value such as "Transactional," denoting the nature of the data as related to business transactions. The third feature might have a value like "POS system," indicating the point-of-sale system as the source of these data records. These features and their values are illustrative and can vary in other cases. For example, the feature vector can include one or more of the following features: storage utilization metrics, priority tags, regulatory compliance requirements, legal or organizational compliance prerequisites, file types, or file sizes. In some implementations, the retention coordinator 134, possibly interfacing with machine learning algorithms, may preprocess and/or perform dimensionality reduction to distill the feature vector to a minimum set of features. A machine learning model can be trained on this minimum feature set, thereby optimizing the computational and memory resources used for the iterative refinement of data retention policies.

As another example, a feature vector for a series of data records can include a first feature concerning data sensitivity, a second feature regarding data modification timestamps, and a third feature related to user engagement levels. The first feature can hold a value such as "Confidential," signifying the data requires heightened security measures. The second feature could be assigned a timestamp, for instance, "2023-05-25 14:30:00," indicating the last modification date and time of the data record. The third feature might contain a numeric value like "7," representing the number of user interactions with that data record over a specified period.

As another example, a feature vector for an assortment of data records can include a first feature representing data owner identity, a second feature detailing the data format, and a third feature indicating cloud storage provider. For example, the first feature may have a value such as "HR Department," indicating the ownership of the data. The second feature can hold a value like "JSON," indicating the data format. The third feature may include a name such as "AWS S3," designating the cloud storage service in use.

The set of observations may be associated with a target variable 215. The target variable 215 may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be associated with an observation. In some cases, different observations may be associated with different target variable values.

In the example 200, the target variable 215 is a retention setting. For instance, the target variable 215 is TTL. TTL can define the lifespan or lifetime of data in a system or network. TTL can specify the duration for which a data record can be retained before it is deleted or purged (e.g., automatically). The TTL setting can represent a variable with a numeric value, such as a unit of time such as seconds, minutes, or days. The TTL could also have values within a predefined range or set of discrete possible time intervals. Additionally, the TTL can be selectable from a list of standardized retention options, such as short-term, medium-term, or long-term retention categories. Each data record may be paired with a unique TTL value, which can diverge among different records within a similar framework.

In example 200, the target variable 215 is an item identifier, which has a value of "120 days". However, the TTL setting can be configured with varied values depending on the nature of the data. For instance, a TTL of "24 hours" could be applied to transactional data that require quick deletion after processing. For data with transient importance such as user session information, a TTL value of "7 days" can be considered suitable. In circumstances necessitating compliance or archival needs, TTL can be extended to periods like "365 days" or even set to "indefinite," ensuring long-term data preservation. For categories of data demanding conditional retention, a TTL value of "pending manual review" can be established, which would halt automatic deletion until human intervention is enacted. In some scenarios, the TTL value can be configured according to a mathematical function, for instance, "TTL=f(x)," where 'x' may denote variables such as user engagement metrics or data sensitivity evaluations.

It will be appreciated that the target variable 215 can vary across embodiments within the scope of the inventive concepts. For instance, the target variable 215 can encompass various other retention parameters beyond TTL. These may include, but are not limited to, retention categories that dictate priority, deletion trigger events, storage tier designations, version numbers, geographical storage locations, encryption requirements, backup frequencies, designated data owners, auditing flags, legal hold statuses, data classifications, content types, and expiration notification periods. Each of these variables can serve as a distinct target variable, enabling a finely tuned data retention strategy tailored to meet organizational or regulatory needs.

The target variable may represent a value that a machine learning model 211 is being trained to predict, and the feature set may represent the variables that are input to a trained machine learning model 245 to predict a value for the target variable. The set of observations may include target variable values so that the machine learning model 211 can be trained to recognize patterns in the feature set 210 that lead to a target variable value. A machine learning model that is trained to predict a target variable value may be referred to as a supervised learning model or a predictive model. When the target variable is associated with continuous target variable values (e.g., a range of numbers), the machine learning model 211 may employ a regression technique. When the target variable is associated with categorical target variable values (e.g., classes or labels), the machine learning model 211 may employ a classification technique.

In some implementations, the machine learning model 211 may be trained on a set of observations that do not include a target variable (or that include a target variable, but the machine learning model 211 is not being executed to predict the target variable). This may be referred to as an unsupervised learning model, an automated data analysis model, or an automated signal extraction model. In this case, the machine learning model 211 may learn patterns from the set of observations without labeling or supervision, and may provide output that indicates such patterns, such as by using clustering and/or association to identify related groups of items within the set of observations.

As further shown, the machine learning system 300 may partition the set of observations into a training set 220 that includes a first subset of observations of the set of observations, and a test set 225 that includes a second subset of observations of the set of observations. The training set 220 may be used to train (e.g., fit or tune) the machine learning model 211, while the test set 225 may be used to evaluate a machine learning model 211 that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system 300 may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 25%, among other examples). In some implementations, the machine learning system 300 may randomly select observations to be included in the training set 220 and/or the test set 225.

As shown by reference number 230, the machine learning system 300 may train a machine learning model 211 using the training set 220. This training may include executing, by the machine learning system 300, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model 211 that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system 300 may use one or more hyperparameter sets 240 to tune the machine learning model 211. A hyperparameter may include a structural parameter that controls execution of a machine learning algorithm by the machine learning system 300, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model 211 to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model 211, the machine learning system 300 may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system 300 may tune each machine learning algorithm using one or more hyperparameter sets 240 (e.g., based on operator input that identifies hyperparameter sets 240 to be used and/or based on randomly generating hyperparameter values). The machine learning system 300 may train a machine learning model 211 using a machine learning algorithm and a corresponding hyperparameter set 240. In some implementations, the machine learning system 300 may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system 300 may perform cross-validation when training a machine learning model 211. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system 300 may train a machine learning model 211 on the training groups and then test the machine learning model 211 on the hold-out group to generate a cross-validation score. The machine learning system 300 may repeat this training procedure using different hold-out groups and different test groups to generate a cross-validation score for each training procedure. In some implementations, the machine learning system 300 may independently train the machine learning model 211 k times, with each individual group being used as a hold-out group once and being used as a training group k−1 times. The machine learning system 300 may combine the cross-validation scores for each training procedure to generate an overall cross-validation score for the machine learning model 211. The overall cross-validation score may include, for example, an average cross-validation score (e.g., across all training procedures), a standard deviation across cross-validation scores, or a standard error across cross-validation scores.

In some implementations, the machine learning system 300 may perform cross-validation when training a machine learning model 211 by splitting the training set into a number of groups (e.g., based on operator input that identifies the number of groups and/or based on randomly selecting a number of groups). The machine learning system 300 may perform multiple training procedures and may generate a cross-validation score for each training procedure. The machine learning system 300 may generate an overall cross-validation score for each hyperparameter set 240 associated with a machine learning algorithm. The machine learning system 300 may compare the overall cross-validation scores for different hyperparameter sets 240 associated with the machine learning algorithm and may select the hyperparameter set 240 with the best (e.g., highest accuracy, lowest error, or closest to a desired threshold) overall cross-validation score for training the machine learning model 211. The machine learning system 300 may then train the machine learning model 211 using the selected hyperparameter set 240, without cross-validation (e.g., using all of data in the training set 220 without any hold-out groups), to generate a single machine learning model 211 for a machine learning algorithm. The machine learning system 300 may then test this machine learning model 211 using the test set 225 to generate a performance score, such as a mean squared error (e.g., for regression), a mean absolute error (e.g., for regression), or an area under receiver operating characteristic curve (e.g., for classification). If the machine learning model 211 performs adequately (e.g., with a performance score that satisfies a threshold), then the machine learning system 300 may store that machine learning model 211 as a trained machine learning model 245 to be used to analyze new observations, as described below in connection with FIG. 2.

In some implementations, the machine learning system 300 may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system 300 may generate multiple machine learning models, where each machine learning model 211 has the best overall cross-validation score for a corresponding machine learning algorithm. The machine learning system 300 may then train each machine learning model using the training set 220 (e.g., without cross-validation), and may test each machine learning model using the test set 225 to generate a corresponding performance score for each machine learning model. The machine learning model 211 may compare the performance scores for each machine learning model and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model 211 may be trained using a different process than what is described in connection with FIG. 2. Additionally, or alternatively, the machine learning model 211 may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
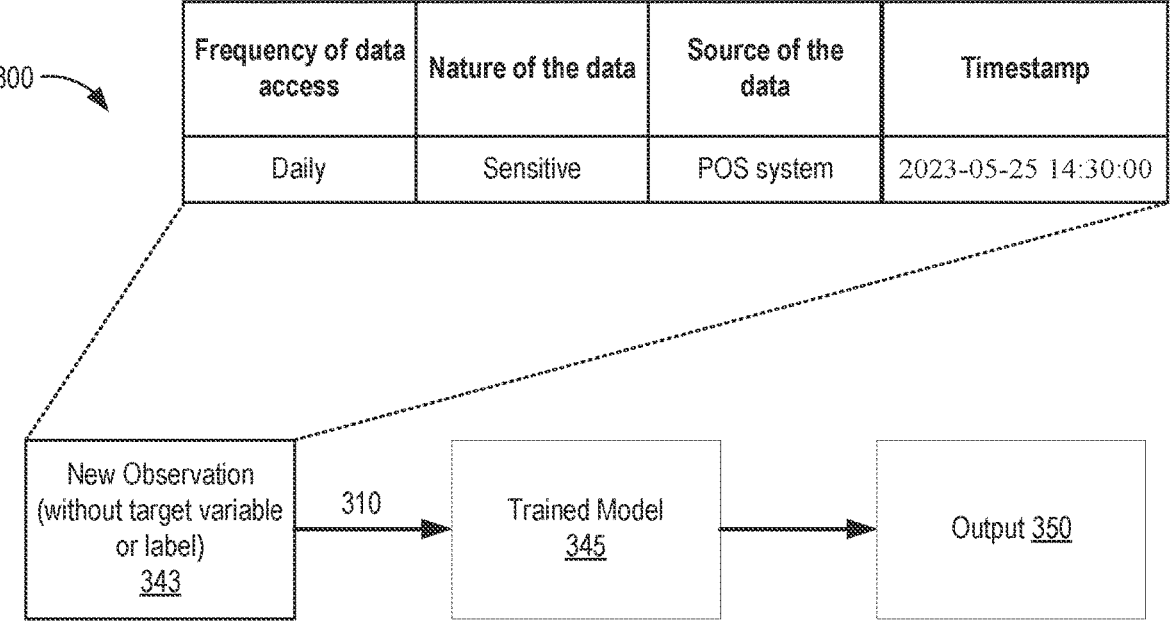
FIG. 3 is a diagram illustrating an example of applying a trained machine learning model to a new observation associated with determining data retention policies.

FIG. 3 is a diagram illustrating an example of applying a trained machine learning model to a new observation associated with determining data retention policies. The new observation may be input to a machine learning system 300 that stores a trained machine learning model 345. In some implementations, the trained machine learning model 345 may be the trained machine learning model 245 described above in connection with FIG. 2. The machine learning system 300 can be part of a computing device, a server, or a cloud computing environment, such as the retention management system 130 of FIG. 1.

As shown by reference number 310, the machine learning system 300 may receive a new observation or a set of new observations 343 and may input the new observation to the machine learning model 345. The new observation may include, for example, a first feature of "Quarterly," a second feature of "Transactional," a third feature of "POS system," and so on.

The machine learning system 300 may apply the trained machine learning model 345 to the new observation to generate an output 350, such as a result indicating a retention setting. The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model 345 and/or observations used to train the machine learning model), such as when unsupervised learning is employed. In some implementations, the output 350 includes an indication of a TTL setting. For example, the output can correspond to the period for which a data record should be stored within the operations data store 120, before being purged or moved to other storage, based on the input features. Furthermore, as described herein, in some cases, the output 350 includes a confidence value for the output.

In some implementations, the trained machine learning model 345 may predict a value of "suboptimal data retention" with a high confidence level. Based on this prediction, the machine learning system 300 can provide a recommendation to revise the existing data retention policies or may automatically adjust these policies. Conversely, if the machine learning model predicts that the current data retention policies are effective with a high confidence level, the machine learning system 300 may continue to operate under the existing policies without modification.

The concepts of the present disclosure significantly enhance the robustness of data management systems by employing a trained neural network to analyze large datasets. This assists in ensuring that the data repository remains current and accurate, which can contribute to improved efficiency and effectiveness of data analytics and governance processes. The machine learning system 300 can enable the recognition and/or identification of tens, hundreds, thousands, or millions of data points and/or variables across a similar scale of observations. This increases accuracy and consistency while reducing the time and computational resources required when compared to manual analysis methods. While FIG. 3 serves as an illustrative example, other examples can differ from what is described in connection with FIG. 3.

FIG. 4 is a flow diagram illustrative of an embodiment of a process 400 for dynamic retention management. Although generally described as being implemented by the retention management system 130, it will be understood that the elements outlined for process 400 can be implemented by one or more computing devices or components that are associated with the environment 100, such as, but not limited to, the POS system 110, the operations data store 120, the metrics manager 132, the retention coordinator 134, and/or the application system 136, etc. Thus, the following illustrative embodiment should not be construed as limiting.

At block 402, the retention management system 130 stores data records in a storage system in accordance with a first data retention policy. These data records can be a subset of a plurality of data records stored in the storage system. The stored data records can be related to point-of-sale transactions occurring across one or more point-of-sale devices within a retail environment. In addition, or alternatively, the data records can be related transactional data, customer interaction data, promotional data, inventory data, or employee data.

The first data retention policy can be generated by the retention coordinator 134, using a process similar to that outline herein, such as in blocks 406 and 408. For example, the first data retention policy can be generated taking into consideration various factors such as regulatory compliance, operational needs, and storage utilization metrics, among others. Alternatively, the first data retention policy can be a default policy, potentially lacking customization for the specific operational environment. Actions like data deletion or migration can be executed pursuant to the first data retention policy. By adhering to this policy, the retention management system 130 can manage storage resource allocation, mitigate operational costs, and remain compliant with applicable regulatory standards.

At block 404, the retention management system 130 retrieves data utilization metrics associated with a plurality of data records stored in the operations data store 120. This retrieval can be triggered by various factors such as, but not limited to, a scheduled system scan, an ad-hoc request from an administrator, or automated triggers based on pre-defined thresholds in storage utilization metrics. The data utilization metrics can be determined or gathered by the metrics manager 132 and may include attributes such as, but not limited to, a frequency of data access, a data record size, or transaction metadata.

In some cases, the metrics manager 132 can extract these metrics from the operations data store 120, employing techniques like SQL queries, API calls, or other data extraction mechanisms compatible with the underlying data storage architecture. The extracted data utilization metrics can serve multiple purposes. For example, the data utilization metrics can be utilized for the refinement of data retention policies by the retention coordinator 134. As another example, the data utilization metrics can contribute to machine learning algorithms, tasked with enhancing the efficiency and effectiveness of data retention policies, thereby aligning with organizational or regulatory requisites. As another example, the data utilization metrics can inform actionable insights for improving storage resource allocation, thereby aiding the retention management system 130 in effectively reducing operational costs and ensuring compliance with relevant regulatory standards.

In some cases, the metrics manager 132 preprocesses the data utilization metrics to generate feature vectors, which can enhance their utility in machine learning algorithms or other analytical processes aimed at refining data retention policies. The feature vectors can be further analyzed by the retention coordinator 134 to adapt or update the data retention policy based on evolving organizational needs or compliance requirements.

At block 406, the retention management system 130 utilizes a computational model (e.g., a trained neural network) to process the data utilization metrics. The computational model can be specialized to quantitatively evaluate the data utilization metrics and/or the data records themselves. The evaluation can be based on a composite metric, which can be derived from a plurality of attributes including, but not limited to, data access frequency, the data record size, or transaction metadata. The computational model can output data retention settings for each data record or sets of data records collectively. The computational model can be trained on historical data, which may encompass a variety of factors including, but not limited to, past retention policies, storage utilization metrics, operational necessities, legal or organizational compliance prerequisites, frequency of data access, and timing of data access. This training allows the computational model to effectively analyze current metrics and feature vectors for the purpose of generating a new or refined data retention policy.

At block 408, the retention management system 130 can generate a second data retention policy based on the output of the computational model. In some embodiments, the second data retention policy can serve as an augmentation or modification to an existing data retention policy, thereby allowing the system to dynamically adapt to new information or changes in the operational environment. For example, if the computational model identifies a shift in data access patterns that suggests a different storage duration is more optimal, the second data retention policy can be configured to adjust the storage settings for relevant data records within the operations data store 120. Alternatively, the second data retention policy could entirely replace a previous data retention policy if substantial changes in operational or regulatory conditions warrant such a replacement.

The generation of the second data retention policy can be coordinated by the retention coordinator 134 in association with the computational model. In some cases, the retention coordinator 134 generates the second data retention policy by applying data retention settings generated by the computational model. In some cases, the computational model outputs/generates the second data retention policy. The application system 136 can implement the second data retention policy within the operations data store 120 to ensure compliance with the new set of criteria, rules, or conditions outlined in the second data retention policy.

At block 410, the retention management system 130 can be configured to alter the storage settings for a subset or all of the data records within the operations data store 120, in line with a second data retention policy. The modification to storage settings can occur based on various criteria specified by this second data retention policy, which can be distinct from a prior or initial data retention policy. Such criteria can encompass factors like regulatory compliance, operational needs, frequency of data access and timing of data access, the nature and source of the data, legal or organizational compliance requirements, storage utilization metrics, priority tags, file types, or file sizes, among others.

Actions such as the deletion, migration, or retention of data can be executed in accordance with this second data retention policy, thereby enabling the retention management system 130 to effectively manage storage resource allocation, minimize operational costs, and maintain compliance with pertinent regulatory standards.

It will be understood that the various blocks described herein can be implemented in a variety of orders, and that the retention management system 130 can implement one or more of the blocks concurrently and/or change the order, as desired. Furthermore, it will be understood that fewer, more, or different blocks can be used as part of the routine 400.

Terminology

Although this disclosure has been described in the context of some cases and examples, it will be understood by those skilled in the art that the disclosure extends beyond the disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the embodiments described above. Accordingly, unless otherwise stated, or unless clearly incompatible, each embodiment of this inventive concept may include, additional to its essential features described herein, one or more features as described herein from each other embodiment of the inventive concept disclosed herein.

Features, materials, characteristics, or groups described in conjunction with an aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, some features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in some combinations, one or more features from a claimed combination can, in some cases, be excised from the combination, and the combination may be claimed as a subcombination or variation of a sub combination.

Moreover, while operations may be depicted in the drawings or described in the specification in an order, such operations need not be performed in the order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some cases, the actual steps taken in the processes illustrated and/or disclosed may differ from those shown in the figures. Depending on the embodiment, some of the steps described above may be removed, others may be added. Furthermore, the features and attributes of the embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, some aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that some cases include, while other embodiments do not include, some features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that some cases require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in some cases, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method comprising:

storing data records in a storage system according to a first data retention policy, the data records forming a part of a plurality of data records stored in the storage system and being associated with point-of-sale transactions across one or more point-of-sale devices in a retail environment;

retrieving data utilization metrics for a set of data records of the plurality of data records, wherein the data utilization metrics comprise frequency of data access, timing of data access, and storage-utilization parameters indicative of remaining storage capacity;

processing the data utilization metrics using a trained machine-learning model configured to generate a composite retention-adjustment metric derived from the frequency of data access, the timing of data access, and the storage-utilization parameters;

determining, with the trained machine-learning model, data-record-specific retention settings based on the composite retention-adjustment metric, the trained machine-learning model having been trained using historical data comprising prior data-access patterns and prior retention outcomes;

generating a second data retention policy defining storage durations and migration actions for the data records based on the data-record-specific retention settings; and modifying storage of at least some data records of the set of data records based on the second data retention policy, including modifying metadata associated with the at least some data records to implement deletion, migration, or tiered-storage operations, wherein at least some subsequent data records are stored in the storage system according to the second data retention policy;

recalculating, during operation of the storage system and on an ongoing or event-driven basis, the composite retention-adjustment metric based on updated data utilization metrics obtained during operation of the storage system, the recalculating forming part of an adaptive feedback loop in which the second data-retention policy is updated, or a new data-retention policy is generated, based on the recalculated composite retention-adjustment metric, such that subsequent data records are stored in accordance with the updated or newly generated data-retention policy.

2. The method of claim 1, wherein the frequency of data access is characterized by a number of read or write operations performed on each data record within a predetermined time interval.

3. The method of claim 1, wherein the timing of data access is characterized by a temporal profile indicating specific time intervals at which data is accessed.

4. The method of claim 1, wherein the data utilization metrics further comprise transactional metadata, the transactional metadata comprising transaction timestamps, point-of-sale devices identifiers, customer identifiers, or product identifiers associated with the point-of-sale transactions, wherein the retention-adjustment composite metric is further derived from the transactional metadata.

5. The method of claim 1, wherein the data utilization metrics further comprise data record size attributes, wherein the composite metric is further derived from the data record size attributes.

6. The method of claim 1, wherein the second data retention policy reduces a retention duration for a first data record in comparison to a corresponding retention duration specified by the first data retention policy for the first data record, wherein the reduction is based at least in part on a size of the first data record.

7. The method of claim 1, further comprising retrieving storage utilization metrics, the storage utilization metrics characterized by at least one of available storage, used storage, or storage efficiency, wherein the composite metric is further derived from the storage utilization metrics.

8. The method of claim 1, further comprising retrieving compliance-related data indicative of at least one of a legal policy or an organizational policy, wherein the composite metric is further derived from the compliance-related data such that data retention settings reflected by the second data retention policy are congruent with the at least one of the legal policy or the organizational policy.

9. The method of claim 1, further comprising determining patterns of manual changes, the patterns of manual changes characterized by a sequence of user-initiated alterations to data within similar categories, wherein the composite metric is further derived from the patterns of manual changes.

10. The method of claim 1, further comprising retrieving data obsolescence metrics, these data obsolescence metrics characterized by a decay factor that quantifies an age or diminishing utility of a respective data record, wherein the composite metric is further influenced by the data obsolescence metrics.

11. The method of claim 1, wherein each of the first data retention policy and the second data retention policy comprises Time-to-Live (TTL) parameters for the set of data records, the TTL parameters delineating a temporal interval for at least one of automated deletion or automated translocation to a remote storage medium.

12. The method of claim 1, wherein the plurality of data records comprises data records selected from a group consisting of: order-related records, transaction-related records, payment-related records, entries within a receipts input table, entries within an audit table, entries within a promotions table, item attribute records, or price determinant records.

13. The method of claim 1, wherein the data utilization metrics comprise a timestamp indicating a last modification date of each data record, and wherein the second data retention policy assigns data records with more recent modification dates to relatively longer retention periods.

14. The method of claim 1, wherein the modifying comprises interfacing with the storage system through an application programming interface (API) to initiate a series of commands that modify metadata associated with the set of data records, wherein the metadata modifications dictate how or when data records are deleted or moved to another storage system.

15. A system comprising one or more processors configured to:

store data records in a storage system according to a first data retention policy, the data records forming a part of a plurality of data records stored in the storage system and being associated with point-of-sale transactions across one or more point-of-sale devices in a retail environment;

retrieve data utilization metrics for a set of data records of the plurality of data records, wherein the data utilization metrics comprise frequency of data access, timing of data access, and storage-utilization parameters indicative of remaining storage capacity;

process the data utilization metrics using a trained machine-learning configured to generate a composite retention-adjustment metric derived from the frequency of data access, the timing of data access, and the storage-utilization parameters;

determine, with the trained machine-learning model, data-record-specific retention settings based on the composite retention-adjustment metric, the trained machine-learning model having been trained using historical data comprising prior data-access patterns and prior retention outcomes;

generate a second data retention policy defining storage durations and migration actions for the data records based on the data-record-specific retention settings;

modify storage of at least some data records of the set of data records based on the second data retention policy, including modifying metadata associated with the at least some data records to implement deletion, migration, or tiered-storage operations, wherein at least some subsequent data records are stored in the storage system according to the second data retention policy; and recalculate, during operation of the storage system and on an ongoing or event-driven basis, the composite retention-adjustment metric based on updated data utilization metrics obtained during operation of the storage system, wherein the recalculation forms part of an adaptive feedback loop in which the second data-retention policy is updated, or a new data-retention policy is generated, based on the recalculated composite retention-adjustment metric, such that subsequent data records are stored in accordance with the updated or newly generated data-retention policy.

16. The system of claim 15, wherein the one or more processors are further configured to:

retrieve transactional metadata, the transactional metadata comprising transaction timestamps, point-of-sale devices identifiers, customer identifiers, or product identifiers associated with the point-of-sale transactions;

retrieve data record size attributes; and retrieve storage utilization metrics, the storage utilization metrics characterized by at least one of available storage, used storage, or storage efficiency, wherein the composite metric is further derived from the transactional metadata, the data record size attributes, and the storage utilization metrics.

17. The system of claim 15, wherein the one or more processors are further configured to retrieve compliance-related data indicative of at least one of a legal policy or an organizational policy, wherein the composite metric is further derived from the compliance-related data such that the data retention settings reflected by the second data retention policy are congruent with the at least one of the legal policy or the organizational policy.

18. The system of claim 15, wherein the one or more processors are further configured to determine patterns of manual changes, the patterns of manual changes characterized by a sequence of user-initiated alterations to data within similar categories, wherein the composite metric is further derived from the patterns of manual changes.

19. A non-transitory computer-readable media comprising computer-executable instructions that, when executed by one or more processors, cause the one or more processors to:

store data records in a storage system according to a first data retention policy, the data records forming a part of a plurality of data records stored in the storage system and being associated with point-of-sale transactions across one or more point-of-sale devices in a retail environment;

retrieve data utilization metrics for a set of data records of the plurality of data records, wherein the data utilization metrics comprise frequency of data access, timing of data access, and storage-utilization parameters indicative of remaining storage capacity;

process the data utilization metrics using a trained machine-learning configured to generate a composite retention-adjustment metric derived from the frequency of data access, the timing of data access, and the storage-utilization parameters;

determine, with the trained machine-learning model, data-record-specific retention settings based on the composite retention-adjustment metric, the trained machine-learning model having been trained using historical data comprising prior data-access patterns and prior retention outcomes;

generate a second data retention policy defining storage durations and migration actions for the data records based on the data-record-specific retention settings;

modify storage of at least some data records of the set of data records based on the second data retention policy, including modifying metadata associated with the at least some data records to implement deletion, migration, or tiered-storage operations, wherein at least some subsequent data records are stored in the storage system according to the second data retention policy; and recalculate, during operation of the storage system and on an ongoing or event-driven basis, the composite retention-adjustment metric based on updated data utilization metrics obtained during operation of the storage system, wherein the recalculation forms part of an adaptive feedback loop in which the second data-retention policy is updated, or a new data-retention policy is generated, based on the recalculated composite retention-adjustment metric, such that subsequent data records are stored in accordance with the updated or newly generated data-retention policy.

* * * * *